May 2, 1950

L. POLLOCK

2,505,990

MOTION-PICTURE CAMERA ACCESSORY FOR
MAKING TITLES AND SPECIAL EFFECTS

Filed March 3, 1947

LATHAM POLLOCK,
Inventor

By Forrest J. Lilly
Attorney

LATHAM POLLOCK, Inventor

May 2, 1950

L. POLLOCK

2,505,990

MOTION-PICTURE CAMERA ACCESSORY FOR MAKING TITLES AND SPECIAL EFFECTS

Filed March 3, 1947

LATHAM POLLOCK,
Inventor

Attorney

Patented May 2, 1950

2,505,990

UNITED STATES PATENT OFFICE 2,505,990

MOTION-PICTURE CAMERA ACCESSORY FOR MAKING TITLES AND SPECIAL EFFECTS

Latham Pollock, Los Angeles, Calif., assignor to Century Engineering Company, Los Angeles, Calif.

Application March 3, 1947, Serial No. 732,019

13 Claims. (Cl. 88—16)

The present invention relates to accessory equipment for motion picture cameras, and more particularly to a device for use by amateur photographers in making a wide variety of title effects as well as other special photographic effects.

The principal object of the invention is to provide a single accessory unit of exceptional versatility embodying means for making an almost endless variety of title and special effects, including "zoom" titles, wipes, double exposures, scrolls, flip-flops, swing-arounds, forward and backs, fadeouts, outline mask shots, and numerous other effects which have heretofore been possible only with expensive and elaborate professional equipment. Prior titlers for amateur photography have in every instance been limited to a relatively few effects, making it necessary for the advanced amateur to purchase several units in order to obtain the full range of special effects desired. The present invention eliminates the need for a multiplicity of titling units and special effect accessories by providing a single unit capable of producing practically every desired effect within the range of the camera's limitations.

Another object of the invention is to provide a combination titler and special effects unit which is adapted to be set up on its own supporting legs for conventional table-top operation, and which is also capable of being mounted on a standard tripod with the camera whereby titles may be made between scenes without removing the camera from the tripod. Outline mask shots, double exposures, extreme close-ups, and other special effects of professional quality may also be made with utmost ease and simplicity while the unit is mounted on the tripod with the camera. A related object in connection with the use of the device on a tripod is the provision of means for holding accessory lenses, filters, sunshades, and the like so that one set of lenses, filters, etc., may be used interchangeably with several objective lenses of different focal lengths, thereby eliminating duplication of such items.

A further object of the invention is the provision of a combined titler and special effects unit which is adjustable to accommodate any make or model of amateur motion picture camera, both 8 mm. and 16 mm., and which therefore need not be discarded when changing size or type of camera equipment.

The foregoing and other objects and advantages of the present invention will become apparent to those skilled in the art upon consideration of the following detailed description of the preferred embodiment thereof, reference being had to the accompanying drawings in which.

Figure 1:
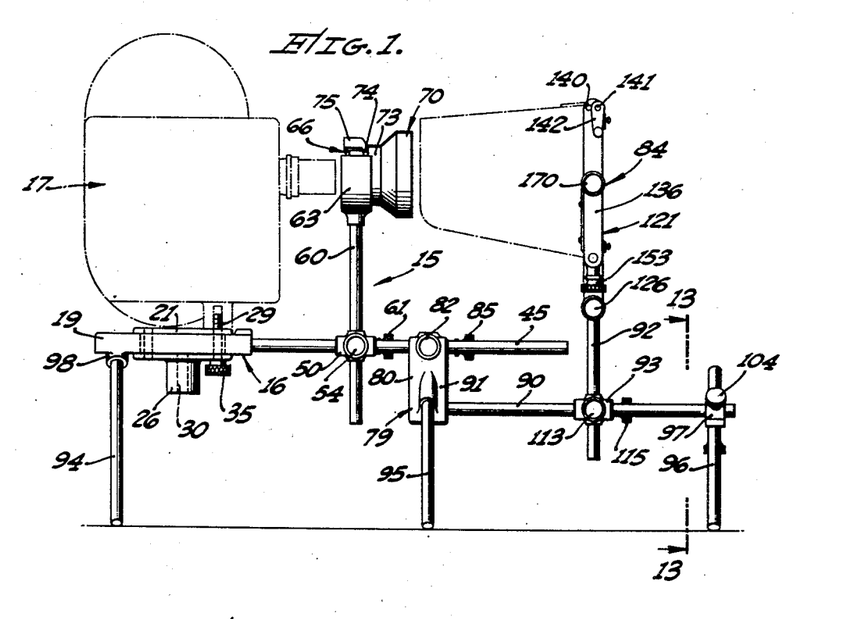
Figure 1 is a side elevation of the invention as set up for making titles on a table top or other flat surface.
Figure 2:
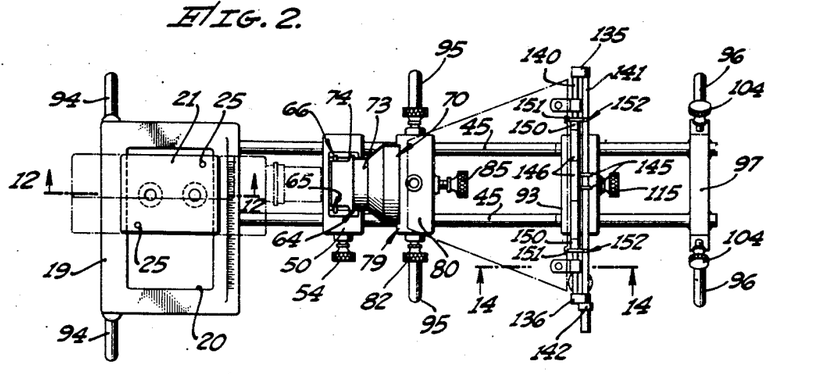
Figure 2 is a top plan view of the same.
Figure 3:
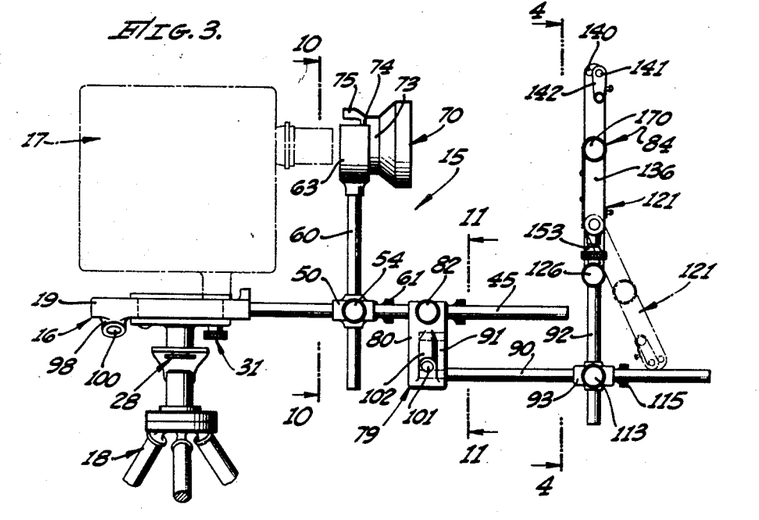
Figure 3 is a side elevational view, showing the unit mounted on the head of a tripod.

In the drawings, the combination titler and special effects unit of the invention is designated in its entirety by the reference numeral 15, and comprises a camera base assembly 16 which is adapted to be secured to the tripod socket of a camera 17 and which may be set up for table top photography on legs provided for that purpose, as shown in Figures 1 and 2, or mounted on the head of a tripod 18, as shown in Figure 3. The camera base assembly 16 consists of a flat, horizontally disposed frame member 19, preferably in the form of a die casting, having a rectangular opening 20 provided therein, the long dimension of which extends transversely across the frame. Slidably disposed within the opening 20 is a base plate 21 which is rectangular in plan form with its long dimension extending in a fore and aft direction, and which extends from the front edge of the opening to the rear edge thereof. The width of the opening 20, measured from side to side, is approximately twice the width of the base plate 21, permitting the latter to be shifted laterally between two extreme positions located entirely to one side or the other of the center line of the frame 19. The base plate 21 is also preferably a die casting and is provided with flanges 22 and 23 projecting from its front and rear ends along the top edges thereof. The flanges 22, 23 extend over and lie on top of the margins of the opening 20 to support the base plate from the frame member 19. Fixed to the bottom of the base plate 21 is a plate 24 which extends beyond the front and rear ends of the plate 21 to form flanges engaging the frame member 19 along the bottom margins of the opening 20. The bottom plate 24 is connected to the base plate 21 by two screws 25 (see Figure 2) located at opposite corners thereof, said screws being threaded into tapped holes in the base plate 21. Extending downwardly from the midpoint of the bottom plate 24 is a boss 26 having a central tapped hole 30 which is adapted to receive the attachment screw 28 of the tripod 18.

The camera 17 is secured to the base plate 21 by means of an attaching screw 31 which may be inserted through either one of two fore and aft spaced holes 32, 33 in the base plate 21 and screwed into the tripod socket 29 of the camera. The screw 31 has a knurled head 34, with a shoulder at 35 which engages the bottom surface of the plate 24. The stem 36 of the screw 31 has threads 40 formed on the upper end thereof and an annular groove 41 in the portion of its length lying just above the top face of the plate 24. Both of the holes 32, 33 are counterbored from the bottom surface to form shallow recesses 42, and a U-shaped retainer 43 is adapted to be positioned in the recess of the hole occupied by the screw 31 so that the two arm portions of the retainer are disposed within the channel portion 41 on either side thereof to retain the screw 31 in the camera base assembly 16. The screw 31 may be removed from the hole 32 and inserted into the other hole 33 by removing the two screws 25, which permits the bottom plate 24 to separate from the base plate 21. The U-shaped retainer 43 can then be removed from the screw 31, and the latter withdrawn from the bottom plate 24. The screw 31 is then inserted through the rear hole of the bottom plate 24, the retainer 43 replaced in the groove 41, and the screws 25 replaced.

Projecting forwardly from the front edge of the frame member 19 are two laterally spaced, parallel guide rods 45, the rear ends of which are threaded and screwed into tapped holes in the frame member. The guide rods 45 are offset to one side of the center line of the frame member 19, with one of said rods being positioned adjacent the left hand end of the frame member 19 and the other lying substantially at the midpoint thereof.

Figure 10:
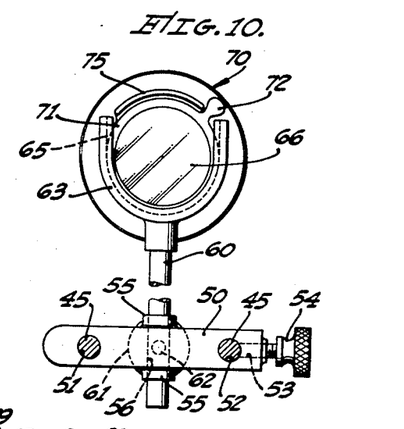
Figure 10 is a view of the lens holder assembly, as seen from 10—10 in Figure 3.

Slidably mounted on the guide rods 45 is a carrier 50 having two laterally spaced holes 51 and 52 provided therein to receive the rods. Extending into the carrier 50 from the right hand end thereof and intersecting hole 52 is a tapped hole 53 which receives a binding screw 54, the purpose of which is to lock the carrier in adjusted position along the rods 45. On the top and bottom surfaces of the carrier 50 midway between the two guide rods 45 are raised bosses 55, and extending through the centers of these bosses is a vertical hole 56. A post 60 is slidably disposed within the hole 56 and is locked in vertically adjusted position by means of a knurled head binding screw 61 which is threaded into a tapped hole 62 extending into the carrier from the front edge thereof and intersecting the hole 56. A U-shaped lens holder 63 is mounted on the top end of the post 60 and is provided with a pair of fore and aft spaced grooves 64 and 65 on its inner surface which are adapted to receive supplementary lenses 66 (Figure 1) for titling or other close-up work, or color filters for cloud effects, and a lens shade 70. The supplementary lenses and filters are preferably provided with narrow metal rims 71 (Figure 10) around their peripheral edges which seat in the rear groove 65, and may also have handles 72 by which they may be handled without touching the glass. The lens shade 70 is provided with a barrel portion 73 having a narrow radial flange 74 at its rear end which is adapted to seat in the front groove 64 of the holder 63, and also has a slightly elevated cylindrically curved hood portion 75 extending rearwardly from the top rear edge of the barrel 73 so as to cover the lens 66 or filter and shield the same against the direct rays of the sun or other source of illumination. The hood portion 75 is slightly shorter in span than the distance between the arms of the U-shaped holder 63, leaving a narrow gap through which the handle 72 of the lens 66 projects.

The guide rods 45 are supported at their front ends by an offset leg assembly designated in its entirety by the reference numeral 79 and comprising an inverted U-shaped member 80, preferably a die casting, having a pair of laterally spaced, fore and aft extending holes 81 in its upper corners which receive the front ends of the rods 45. The rods are slidable through the holes 81 and are adapted to be locked with respect to the member 80 by means of two knurled head binding screws 82 which are threaded into tapped holes extending in from opposite sides of the member 80 and intersecting the holes 81. A vertical hole 83 extending through the top of the member 80 midway between the rods 45 provides an alternate socket for the supporting post of a platen assembly, indicated generally at 84, which will be described in detail presently, or for any other accessory desired. A knurled head binding screw 85 is threaded into a tapped hole in the front face of the member and is engageable with the supporting post of the platen assembly to lock the same in vertically adjusted position.

Figure 11:
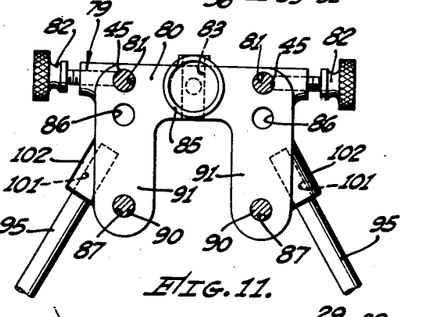
Figure 11 is a view of the offset leg support, taken along the line 11—11 in Figure 3.
Figure 12:
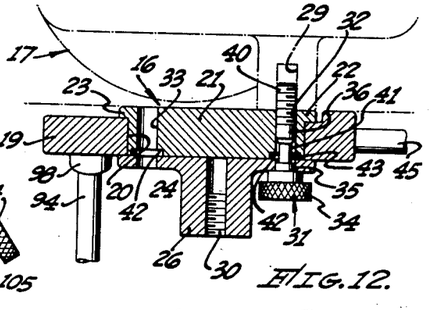
Figure 12 is an enlarged sectional view taken through the camera base plate and associated frame along the line 12—12 in Figure 2.
Figure 13:
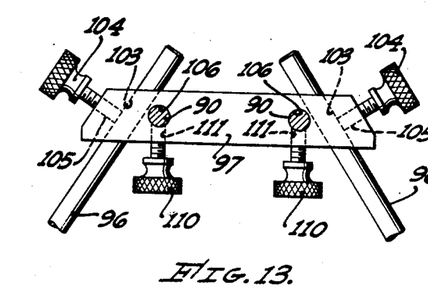
Figure 13 is a view of the front end support assembly as seen from the line 13—13 in Figure 1.

Extending horizontally into the front face of the U-shaped member 80 are two vertically spaced pairs of holes 86 and 87 (see Figure 11) which are tapped to receive the threaded rear ends of forward guide rods 90. Each pair of holes 86, 87 is spaced apart laterally the same distance as the holes 81, and is in vertical alignment therewith. The top holes 86 are located just below the holes 81, while the bottom holes 87 are disposed in the bottom ends of the downwardly extending legs 91 of the member 80. The forward guide rods 90 may be inserted optionally into either pair of holes 86 or 87, and in the drawings are shown in the bottom holes 87. The purpose of the two pairs of holes is to permit raising or lowering the rods 90 to provide a greater range of vertical adjustment for the platen assembly 84 with reference to the camera base assembly 16 than would otherwise be available by merely sliding the supporting post 92 through its associated carrier 93. The advantage of this arrangement is that if the forward rods 90 were fixed to the offset leg support member at one point only, it would be necessary to locate the rods down near the bottom ends of the legs 91 so as to permit lowering the platen assembly 84 down far enough to accommodate certain camera models in which the objective lens is located only a short distance above the tripod socket. Then, in order to permit raising the platen assembly to a level sufficiently high to accommodate other camera models in which the objective lens is located high above the tripod socket, it would be necessary to use a long support post 92 to gain the necessary height. However, if the post 92 is made long enough to serve that purpose, its bottom end will strike the table top when the platen is in its lowermost position unless the supporting legs of the unit are made quite long. The use of long supporting legs is objectionable because the entire unit then stands so high as to be bulky and unsteady. Thus, by providing two vertically spaced sets of holes in the offset leg support member 80 into which the forward rods 90 may optionally be inserted, it becomes possible to secure the maximum vertical adjustment of the platen assembly while at the same time using relatively short support legs.

The support legs referred to above comprise two rear legs 94 which are adapted to be screwed into the frame member 19, two intermediate legs 95 which are adapted to be screwed into the offset leg support member 80, and two front legs 96 which are slidably secured in a front support member 97 mounted on the front ends of the forward rods 90. The camera base frame member 19 is provided at its rear corners with two downwardly and outwardly projecting bosses 98 having tapped holes 100 (Figure 3) formed therein which receive the threaded upper ends of the rear legs 94. When inserted into the holes 100, the legs 94 extend downwardly in laterally diverging relationship to provide a stable base for the unit. The intermediate legs 95 are likewise threaded at their upper ends and screwed into tapped holes 101 provided in downwardly and outwardly extending bosses 102 formed on the outer sides of the legs 91. The front legs 96 extend through downwardly and outwardly inclined holes 103 formed in the outer ends of the front support member 97 and are slidable therein. Knurled head binding screws 104 are threaded into tapped holes 105 extending into the ends of the members 97 perpendicular to the holes 103, and engage the legs 96 to lock the same in adjusted position. The legs 96 are made long enough to reach the table top when the rods 90 are set in the top holes 86 of the member 80, and are moved up through the holes 103 to shorten their effective lengths when the rods 90 are set in the bottom holes 87. The forward guide rods 90 extend through and are slidable in two laterally spaced holes 106 in the member 97. Knurled head binding screws 110 are threaded into tapped holes 111 in the bottom of the member 97 and engage the rods 90 to lock the front support member to the rods.

The platen assembly carrier 93 mentioned earlier is slidably mounted on the forward guide rods 90 between the offset leg assembly 79 and the front support member 97, and is identical in shape to the lens holder carrier 50, having two laterally spaced, horizontally disposed holes 111 formed therein through which the rods 90 extend, and a vertical hole 112 midway between the rods through which the post 92 extends. A knurled head binding screw 113 threaded into a tapped hole 114 in one end of the carrier 93 engages the right hand rod 90 to lock the carrier in position, and a second binding screw 115 threaded into a tapped hole 116 in the front of the carrier engages the post 92 to lock the latter in vertically adjusted position.

Figure 4:
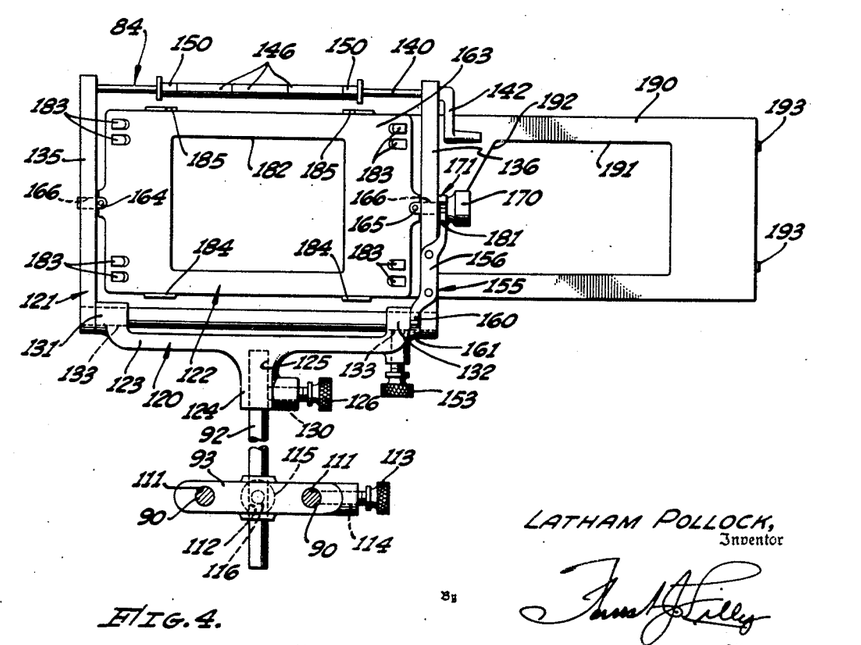
Figure 4 is an enlarged sectional view taken along the line 4—4 in Figure 3, showing the platen assembly and support therefor in elevation.

The platen assembly 84 is mounted on top of the post 92 and comprises a yoke 120, rectangular supporting frame 121, and platen 122. The yoke 120 includes a transversely disposed bar 123 having a downwardly extending boss 124 at its midpoint which is provided with a socket 125. The top end of the post 92 is inserted into the socket 125, and the platen assembly is rotatable thereon. A binding screw 126 is threaded into a tapped hole 130 in one side of the boss 124 and is engageable with the post to lock the platen assembly against turning. Offset upwardly from the bar 123 at opposite ends thereof are bosses 131 and 132 which are formed with transversely aligned holes 133 (Figure 4). A cylindrical rod 134 is journaled in the holes 133 and projects laterally beyond the outer ends of the bosses 131, 132. Fixedly mounted on the ends of the rod 134 are two upwardly extending side bars 135 and 136 which are connected at their upper ends by cross rods 140 and 141 (see Figure 2). The rods 140, 141 are parallel to one another and are spaced apart in a fore and aft direction. The rod 140, which is nearest to the camera, is fixedly secured at its ends in the side bars 135, 136, while the other rod 141 is journaled in the side bars and has a crank handle 142 fixed to the right hand end thereof which projects beyond bar 136.

Figures 5, 6, 8:
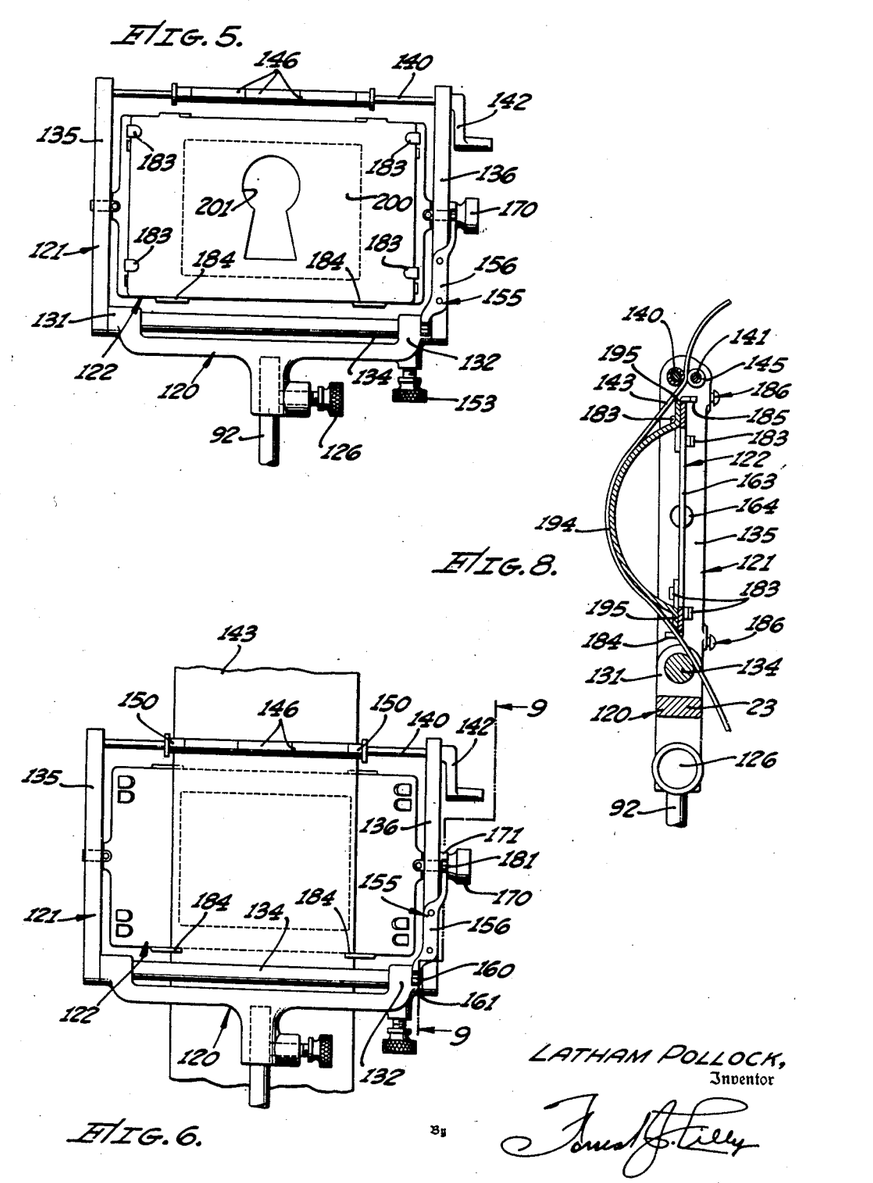
Figure 5 is a view similar to Figure 4, showing a typical outline mask mounted in the card holder.
Figure 6 is another view of the platen assembly, showing the manner in which the device may be used to obtain scroll effect titles.
Figure 8 is an enlarged sectional view taken along the line 8—8 in Figure 7.
Figure 7:
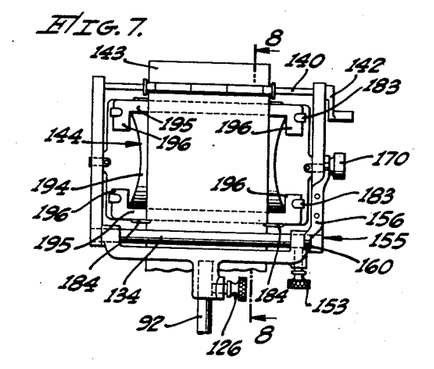
Figure 7 is another view of the platen assembly with a cylindrically curved scroll plate mounted thereon.

The purpose of the rear rod 141 and crank handle 142 is to provide means for pulling a title scroll 143 upwardly across the face of the platen, as in Figure 6, or around a cylindrically curved scroll plate 144 mounted on the platen, as in Figures 7 and 8, and to this end the drive rod 141 is provided with two rather closely spaced, circumferentially extending grooves near its midpoint in which are seated O-rings 145 of neoprene or other rubber-like material. The O-rings 145 bear on the center roller of three rollers 146 which are journaled on rod 140, and the title scroll is inserted between the O-rings and rollers, as shown in Figure 8. Also journaled on the rod 140 are two end rollers 150 having radial flanges 151 which extend into circumferential grooves 152 in the drive rod 141 and which serve to confine the scroll between them so that the latter is prevented from wandering to one side.

From the foregoing, it is seem that the rectangular frame 121 is formed by the bottom rod 134, side bars 135, 136, and top rods 140, 141. The frame 121 is adapted to be folded down out of the field of the camera lens, as shown in dot-dash lines in Figure 3, by virtue of its pivotal support in the bosses 131, 132 of the yoke 120 and may be locked in either erect or folded position by means of a binding screw 153 which is threaded into a tapped hole 154 (see Figure 4) extending upwardly from the bottom of the cross bar 123 at the right hand end thereof and intersecting the hole 133.

Means are also provided for locating the frame 121 exactly perpendicular to the axis of the camera lens, said means being preferably in the form of a spring catch 155 comprising a spring strip 156 which is secured to the lower portion of the right hand bar 136. The bottom end of the strip 156 is offset laterally inward and is bent to form a V-shaped lip 160 which bears on the peripheral surface of a cylindrical extension 161 of the boss 132 and which is adapted to seat in a V-notch 162 formed therein when the platen assembly is in its perpendicular position.

Figure 9:
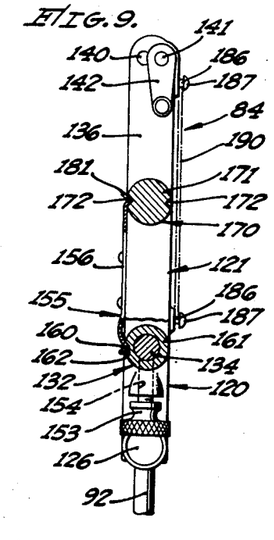
Figure 9 is an enlarged detail view taken along the line 9—9 in Figure 6.

The platen 122 comprises a flat, rectangular plate 163 of sheet metal disposed within the frame 121 and pivotally supported thereon for rotation about a horizontal axis midway between its top and bottom edges. Outwardly projecting pivot pins 164 and 165 are fixed to the side edges of the plate 163 at their midpoints and are received within journal holes 166 in the frame side bars 135, 136. The right hand pin 165 has a knob 170 formed on its outer end, by means of which the platen can be turned over. The knob 170 is provided with a cylindrical hub portion 171 having two V-notches 172 formed therein 180 degrees apart (see Figure 9) which are adapted to receive a V-shaped lip 181 at the top end of a laterally offset upper portion of the spring strip 156. The lip 181 rides on the hub portion 171 of the knob 170 and seats in one or the other of the notches 172 when the platen 122 is parallel to the side members 135, 136.

The plate 163 of the platen is cut out in its center to form a rectangular opening 182, the purpose of which will become apparent presently, and is additionally provided with eight fingers 183 which are struck out from the plate in pairs at the four corners thereof so that four of the fingers stand out from one face of the plate while the other four stand out from the opposite face. The fingers 183 extend laterally inward toward the midpoint of the plate 163 and are adapted to receive and hold the title cards, cut-out masks, or scroll plate 144. Two laterally spaced ears 184 are bent up forwardly from the bottom edge of the plate 163 to provide a limit stop or bottom rest for the title cards, etc., and are notched at their inner ends to receive the edges of a title scroll 143 to hold the latter back against the bottom edge of the platen and to guide the scroll up the center of the platen. A second pair of ears 185 are bent down rearwardly from the top edge of the plate, so that when the platen is turned over they project forwardly from the bottom edge thereof and serve in the same capacity as the first-mentioned ears 184.

Projecting from the rear edge of each of the frame side bars 135, 136 is a pair of vertically spaced studs 186 having heads 187 which are spaced out a short distance from the surfaces of the bars. These studs serve as supports and guides for a wipe slide 190, shown in elevation in Figure 4 and indicated by dot-dash lines in Figure 9, comprising a flat, elongated rectangular plate having an opening 191 located to one side of the center thereof. The opening 191 is approximately the same height as the opening 182 in the platen, and has parallel top and bottom edges, with a vertical side edge adjacent one end of the plate. The other side edge 192, adjacent the midpoint of the plate, is preferably disposed diagonally, as shown in Figure 4, although it may be made vertical, or with any desired contour for particular wipe effect. The shorter of the horizontal edges is approximately the same in length as the horizontal dimension of the platen opening 182, and when the slide is moved over to its extreme left hand position so that the opening 191 is registered with the platen opening 182, the field of the camera lens is entirely unobstructed. As the slide 190 is moved to the right, the diagonal edge 192 progressively cuts across the field of the camera lens until the latter is entirely blocked by the solid blank left hand end portion of the slide, as in Figure 4. Moving the slide to the right, as just described, when the slide is positioned in the platen with the opening 191 on the right hand side creates a wipe-off effect. The wipe-on effect is produced by reversing the slide 190 in the studs 186 so that the opening 191 is now at the left hand end, and the solid blank portion of the slide is in front of the camera lens. The camera is started with the lens blocked, and the slide is then moved to the right so that the diagonal edge 192 of the opening 191 moves across the platen opening 182 until two openings are in registration and the lens is entirely unobstructed for filming the remainder of the scene. The usual procedure is to combine the wipe-off of one scene or title with the wipe-on of the next, and this is done by back winding the film in the camera after making the wipe-off, and then making the wipe-on on the same portion of film as was used in making the wipe-off. A pair of oppositely bent ears 193 are provided at the right hand end (Figure 4) of the slide, and one or the other of these ears is engageable with the side bars 135, 136 to stop the slide with the opening 191 exactly aligned with the platen opening 182.

The scroll plate 144, mentioned earlier in connection with the scroll drive rod 141 and rollers 146—150, is formed out of sheet metal and has a cylindrically curved portion 194, the axis of which extends transversely across the platen, with flat top and bottom flanges 195 which are adapted to lie against the plate 163. The ends of the flanges 195 project beyond the ends of the curved portion 194 and have tabs 196 which extend in toward the horizontal center line of the platen. The tabs 196 are adapted to be inserted down behind the fingers 183 to hold the scroll plate on the platen, and the bottom flange 195 rests on the ears 184 at the lower edge of the platen.

Another effect that can be obtained with the present unit is the outline shot which is made by inserting a cut-out mask, such as the typical mask 200 shown in Figure 5, in behind the fingers 183 of the platen. The illustrative mask 200 is preferably made out of black cardboard, and has an opening such as the key-hole shaped opening 201 through which the scene is photographed. Openings of any other desired outline can be used to create the effect of viewing the scene through binoculars, telescope, door, etc.

Still another effect that can be obtained by using cut-out masks is the double-exposure, wherein the subject appears twice in the same scene. This effect is obtained by using a mask (not shown) having an opening exposing only one-half of the lens field of the camera and obscuring all light from the other half. The scene is taken first with one side of the lens field exposed; the film in the camera is then back-wound and the mask reversed either by removing it and replacing it in the new position or by rotating the platen assembly on the post 92; and the scene rephotographed with the subjects arranged in the unobstructed field of the lens.

Figure 14:
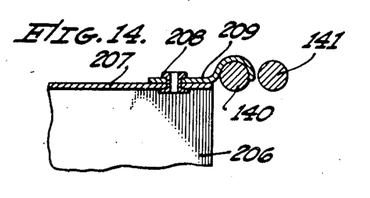
Figure 14 is an enlarged fragmentary section of a detail taken along the line 14—14 in Figure 2.

When using the wipe slide 190 or masks 200, it is desirable to shield them from the light so as to avoid any light reflection back into the camera lens. A removable platen shade 205 is provided for this purpose, and is shown in dot-dash lines in Figures 1 and 2. The shade 205 is preferably made up of cardboard stock folded to provide two side panels 206 and a top panel 207, forming a three-sided hood which is adapted to be mounted on the platen assembly 84 and which extends rearwardly therefrom to a point just ahead of the lens shade 70. The edges of the side and top panels converge rearwardly so that the rear opening of the platen shade 205 is only slightly larger in both height and width than the diameter of the hood on the lens shade 70. Riveted at 208 to the front edge of the top panel 207 adjacent its outer ends are two forwardly projecting hooks 209 which are adapted to be hooked over the cross rod 140, as shown in Figure 14, to support the platen shade therefrom. The front edges of the side panels 206 are disposed just inside the frame bars 135, 136, and engage the pivot pins 164, 165 of the platen to limit the downward swinging movement of the shade about the supporting rod 140. The platen shade construction described above provides a simple, inexpensive hood which is convenient to use and which can be folded flat for compactness in storage.

Flip-flop titles are made by inserting title cards in the opposite sides of the platen in such a manner that both cards appear upright when the platen is turned over on its horizontal axis and the cards are viewed from the camera side. The first card is then photographed, and while the camera is still running the platen is turned over by rotating the knob 170 to bring the second card into view.

Swing-around titles are also made by inserting title cards in the opposite sides of the platen, except that in this case both cards are placed right side up. The first card is photographed, and the platen assembly is then revolved on the support post 92 to bring the second card into view.

Swing-back titles are made by mounting a card in the platen and at the end of the "take," while the camera is still running, swinging the platen assembly back down to the position shown in dot-dash lines in Figure 3. An alternative arrangement would be to swing the platen assembly down forwardly toward the camera.

Zoom titles may be made by starting with the platen assembly at the extreme outer ends of the forward guide rods 90, and then sliding the carrier 93 toward the camera while the latter is running, until the title is brought up to the proper focus position.

Scroll titles, as mentioned earlier, are made by printing the title on a relatively long strip of paper having the same width as the distance between the roller flanges 151, and then pulling the strip up over the titling area by turning the crank 142 while the camera is running. A variation on the scroll title is the rolling title, which is made in the same manner except that the scroll is drawn up over the cylindrically curved portion of a scroll plate 144 which is mounted on the platen. The effect is that of a revolving drum having the titles printed thereon.

The above effects are merely a few illustrative examples of the many titles and special effects which can be obtained by using the present invention, and many others will occur to the experienced and imaginative photographer.

When set up on the tripod, as in Figure 3, the supporting legs 94 and 95 are removed from their respective sockets, and the front support member 97 is removed in its entirety from the forward rods 90. The camera is secured to the base plate 21 by the screw 31, and the base plate is then adjusted laterally until the axis of the camera lens is in alignment with the axis of the lens holder support rod 60. The post 60 is then adjusted vertically to bring the lens holder square in line with the camera lens, and the carrier 50 is moved back on the rods 45 until the lens holder is close to the camera lens. If titles or other special effects are to be made, the platen assembly is adjusted in a fore and aft direction along the rods 90 to the appropriate position, and in a vertical direction by sliding the post 92 through the carrier 93. When the unit has thus been set up, it is ready for use. In the case of outline shots or double exposures, the platen assembly can be folded down out of the way to permit unobstructed use of the viewer in composing the scene and arranging the subjects, after which the platen assembly is erected again and is ready for action. Another advantage of the folding platen assembly is that it permits making titles between scenes by merely inserting the proper title card in the platen, swinging the platen assembly up to erect position, inserting a supplementary lens in the holder 63, and photographing the title. Any of the aforementioned title effects may be made with the unit thus mounted on the tripod, and with careful planning it is possible to photograph entire reels with titles in their correct places, so that little or no cutting and splicing is necessary.

For table top photography, it is necessary only to insert the legs 94, 95 in their sockets, and to replace the front support member 97 on the forward rods 90. The front support member 97 is not always necessary and may be omitted when making conventional titles, although it adds considerably to the steadiness and rigidity of the platen assembly when making any of the special title effects.

While I have shown and described in considerable detail what I believe to be the preferred form of my invention, it is to be understood that such details are merely illustrative, as various changes may be made in the shape and arrangement of the several parts without departing from the scope of the appended claims.

I claim:

1. An accessory unit for motion picture cameras comprising a base plate having attaching means engageable with the camera, a frame member mounted on said base plate and adjustable laterally with respect thereto, a pair of spaced, parallel guide rods extending forwardly from the front edge of said frame member, a carrier slidably mounted on said guide rods, a vertical post supported on said carrier and adjustable vertically with respect thereto, a U-shaped holder mounted on the top end of said post and having a pair of spaced slots provided therein to receive supplementary lenses, filters, lens shades, and the like, an inverted U-shaped member slidably mounted on the front ends of said guide rods, another pair of laterally spaced, parallel guide rods extending forwardly from the front of said last-named member below said first-named guide rods, another carrier slidably mounted on said last-named guide rods, a vertical post supported on said last-named carrier and adjustable vertically with respect thereto, a yoke mounted on the top end of said last-named post for rotation about the axis thereof, a rectangular frame pivoted on said yoke for swinging movement about a horizontal axis adjacent its bottom edge, and a rectangular platen disposed within said frame and pivotally supported thereon for turning about a horizontal axis midway between the top and bottom edges of the platen.

2. An accessory unit for use with a motion picture camera comprising, in combination, a horizontally disposed frame member having a rectangular opening provided therein, a base plate disposed within said opening and movable laterally therein, said base plate having flanges projecting from its front and rear ends along the top edge thereof and overlying the top surface of said frame member along the margins of said opening, a bottom plate secured to the underside of said base plate and extending beyond the front and rear ends thereof, the ends of said bottom plate engaging the bottom surface of said frame member along the margins of said opening to clamp the base plate to the frame member, said bottom plate and said base plate being provided with vertically aligned, fore and aft spaced holes, the holes in said base plate being counterbored to form a recess between the base plate and bottom plate, a threaded camera attaching screw positioned optionally within either of said holes and engageable with the tripod socket of the camera, said screw having a circumferentially extending groove in its stem portion adjacent said recess, a U-shaped retainer positioned within said recess and embracing said groove whereby said screw is held in said base plate when the bottom plate is in place, guide means extending forwardly from the front edge of said frame member, a carrier slidably mounted on said guide means, and a lens holder supported on said carrier and adjustable vertically with respect thereto.

3. An accessory unit for use with a motion picture camera comprising, in combination, a frame member, a base plate mounted on said frame member and adjustable laterally with respect thereto, an attaching screw connected with said base plate and engageable in the tripod socket of the camera, a pair of laterally spaced guide rods extending forwardly from the front edge of said frame member, a carrier slidably mounted on said guide rods, a lens holder supported on said carrier and adjustable vertically with respect thereto, a support member mounted on the front ends of said guide rods, another pair of laterally spaced guide rods extending forwardly from the front of said support member, another carrier slidably mounted on said last-named guide rods, a platen assembly supported on said last-named carrier and adjustable vertically with respect thereto, said support member and said frame member being provided with sockets to receive removable supporting legs for standing the unit on a table top or the like, and said base plate being provided with a threaded socket to receive the attaching screw of a tripod whereby the unit may be used alternatively on a tripod.

4. An accessory unit for use with a motion picture camera comprising, in combination, a frame member, a base plate mounted on said frame member and adjustable laterally with respect thereto, an attaching screw connected with said base plate and engageable with the tripod socket of the camera, a pair of laterally spaced guide rods extending forwardly from the front edge of said frame member, a carrier slidably mounted on said guide rods, a lens holder supported on said carrier and adjustable vertically with respect thereto, an inverted U-shaped support member mounted on the front ends of said guide rods, the downwardly extending legs of said support member being provided with two vertically spaced pairs of holes in the front surface thereof, a pair of forward guide rods engaged optionally in either the upper or lower pair of holes so as to extend forwardly from said support member, another carrier slidably mounted on said forward guide rods, and a platen assembly supported on said last named carrier and adjustable vertically with respect thereto.

5. An accessory unit for use with a motion picture camera comprising, in combination, a frame member, a base plate mounted on said frame member and adjustable laterally with respect thereto, an attaching screw connected with said base plate and engageable with the tripod socket of the camera, a pair of laterally spaced guide rods extending forwardly from the front edge of said frame member, a carrier slidably mounted on said guide rods, a lens holder supported on said carrier and adjustable vertically with respect thereto, an inverted U-shaped support member mounted on the front ends of said guide rods, the downwardly extending legs of said support member being provided with two vertically spaced pairs of holes in the front surface thereof, a pair of forward guide rods engaged optionally in either the upper or lower pair of holes so as to extend forwardly from said support member, another carrier slidably mounted on said forward guide rods, a post slidable vertically with respect to said last-named carrier, and a platen assembly mounted on the top end of said post, said support member and said frame member being provided with sockets to receive removable supporting legs for standing the unit on a table top or the like.

6. An accessory unit for use with a motion picture camera comprising, in combination, a camera base assembly having an attaching screw engageable with the tripod socket of the camera, a pair of guide rods extending forwardly from the front end of said base assembly, a carrier slidably mounted on said guide rods, a lens holder supported on said carrier, a support member mounted on the front ends of said guide rods, said support member having two vertically spaced pairs of holes provided in the front surface thereof, a pair of forward guide rods engaged optionally in either the upper or lower pair of said holes so as to extend forwardly from said support member, another carrier slidably mounted on said forward guide rods, a platen assembly supported on said last-named carrier, a front end support mounted on the front ends of said forward guide rods, said camera base assembly and said support member having supporting legs fixedly secured thereto, said front end support having a pair of legs slidable vertically with respect thereto, and means for securing said legs to said front end support in vertically adjusted position.

7. A platen assembly for use with a motion picture titler and special effects unit, comprising, in combination, a supporting yoke, an open-centered rectangular frame pivoted on said yoke for swinging movement about a horizontal axis adjacent its bottom edge, a platen arranged within said frame and pivotally supported thereon for rotation about a horizontal axis extending through the vertical midpoint of the platen, and a spring catch on said frame engageable with said yoke to locate the frame exactly perpendicular to the optical axis of a camera mounted on said unit, said spring catch being also engageable with said platen to locate the latter exactly parallel to the plane of said frame.

8. A platen assembly for use with a motion picture titler and special effects unit, comprising, in combination, a supporting yoke, an open-centered rectangular frame pivoted on said yoke for swinging movement about a horizontal axis adjacent its bottom edge, a platen arranged within said frame and pivotally supported thereon for rotation about a horizontal axis extending through the vertical midpoint of the platen, a spring member mounted on one of the sides of said frame and terminating at its lower end in a lip bearing on a cylindrical boss on said yoke concentric with the axis of swinging movement of the frame relative to the yoke, said cylindrical boss having a notch in its periphery in which said lip seats when said frame is exactly perpendicular to the optical axis of a camera mounted on said unit, the upper end of said spring member terminating in another lip bearing on a cylindrical hub connected to said platen concentric with the horizontal axis of rotation thereof, and said hub having a pair of notches formed therein 180 degrees apart, said last-named spring lip being adapted to seat in one or the other of said notches when said platen is exactly parallel to said frame.

9. A special effects accessory unit for making masked shots with a motion picture camera comprising, in combination, a camera base assembly attached to the camera, supporting means extending forwardly from said camera base assembly, a platen assembly carried on said supporting means, said platen assembly including an open-center frame having a transversely extending rod across the top edge thereof, said frame having means provided thereon to receive masks whereby a portion of the field of the camera lens within the open center of the frame is obstructed, and a platen shade for shielding said masks from the light on the camera side thereof so as to prevent reflection of light into the camera lens, said platen shade comprising side and top panels which are adapted to be folded upon one another, and a pair of laterally spaced hooks attached to the front edge of said top panel and engageable with said transverse rod to support the shade therefrom, said side panels engaging portions of said platen assembly below said transverse rod to limit downward swinging movement of said shade about said rod, and said platen shade extending from said platen assembly toward said camera for a substantial portion of the distance between them.

10. An accessory unit for making titles and special effects with a motion picture camera, said unit comprising a base plate having attaching means engageable with the camera, a frame member mounted on said base plate, a pair of spaced, parallel guide rods extending forwardly from said frame member, a carrier slidably mounted on said guide rods, a vertical post supported on said carrier and adjustable vertically with respect thereto, a holder mounted on the top end of said post and having means provided therein to receive supplementary lenses, filters, lens shades, and the like, a member slidably mounted on the front ends of said guide rods, another pair of spaced parallel guide rods extending forwardly from said member below said first-named guide rods, another carrier slidably mounted on said last-named guide rods, a vertical post supported on said last-named carrier and adjustable vertically with respect thereto, a platen carried at the top end of said last-named post, said platen having a rectangular opening provided therein corresponding to the field of the camera lens, and means on said platen for holding title cards, masks, and the like.

11. An accessory unit for making titles and special effects with a motion picture camera, said unit comprising a base plate having attaching means engageable with the camera, a frame member mounted on said base plate, a pair of spaced, parallel guide rods extending forwardly from said frame member, a carrier slidably mounted on said guide rods, a vertical post supported on said carrier and adjustable vertically with respect thereto, a holder mounted on the top end of said post and having means provided therein to receive supplementary lenses, filters, lens shades, and the like, a member slidably mounted on the front ends of said guide rods, another pair of spaced, parallel guide rods extending forwardly from said member below said first-named guide rods, another carrier slidably mounted on said last-named guide rods, a vertical post supported on said last-named carrier and adjustable vertically with respect thereto, a yoke mounted on the top end of said last-named post for rotation about the axis thereof, a platen supported on said yoke, said platen having a rectangular opening provided therein corresponding to the field of the camera lens, and means on said platen for holding title cards, masks, and the like.

12. An accessory unit for making titles and special effects with a motion picture camera, said unit comprising a base plate having attaching means engageable with the camera, a frame member mounted on said base plate, a pair of spaced, parallel guide rods extending forwardly from said frame member, a carrier slidably mounted on said guide rods, a vertical post supported on said carrier and adjustable vertically with respect thereto, a holder mounted on the top end of said post and having means provided therein to receive supplementary lenses, filters, lens shades, and the like, a member slidably mounted on the front ends of said guide rods, another pair of spaced, parallel guide rods extending forwardly from said member below said first-named guide rods, another carrier slidably mounted on said last-named guide rods, a vertical post supported on said last-named carrier and adjustable vertically with respect thereto, a yoke mounted on the top end of said last-named post for rotation about the axis thereof, a rectangular frame pivoted on said yoke for swinging movement about a horizontal axis adjacent its bottom edge, a platen supported on said frame, said platen having a rectangular opening provided therein corresponding to the field of the camera lens, and means on said platen for holding title cards, masks, and the like.

13. In an accessory unit for use with a motion picture camera, the combination of: a horizontally disposed frame member having a rectangular opening provided therein, a base plate disposed within said opening and movable laterally therein, said base plate having flanges projecting from its front and rear ends along the top edge thereof and overlying the top surface of said frame member along the margins of said opening, a bottom plate secured to the underside of said base plate and extending beyond the front and rear ends thereof, the ends of said bottom plate engaging the bottom surface of said frame member along the margins of said opening to clamp the base plate to the frame member, said bottom plate and said base plate being provided with vertically aligned, fore and aft spaced holes, the holes in said base plate being counterbored to form a recess between the base plate and bottom plate, a threaded camera attaching screw positioned optionally within either of said holes and engageable with the tripod socket of the camera, said screw having a circumferentially extending groove in its stem portion adjacent said recess, and a retainer positioned within said recessing and extending into said groove, whereby said screw is held in said base plate when said bottom plate is in place.

LATHAM POLLOCK.

REFERENCES CITED

The following references are of record in the file of this patent:

UNITED STATES PATENTS

| Number | Name | Date |
|---|---|---|
| 993,047 | Folmer | May 23, 1911 |
| 1,228,722 | Verbeck | June 5, 1917 |
| 1,232,606 | Ritchie | July 10, 1917 |
| 1,292,149 | Teague | Jan. 21, 1919 |
| 1,337,265 | Poser | Apr. 20, 1920 |
| 1,489,510 | Stromberg | Apr. 8, 1924 |
| 1,591,567 | Shinn | July 6, 1926 |
| 1,637,788 | Schmidt | Aug. 2, 1927 |
| 1,933,817 | Miller et al. | Nov. 7, 1933 |
| 2,235,355 | Brown | Mar. 18, 1941 |
| 2,257,676 | Gance et al. | Sept. 30, 1941 |
| 2,277,448 | Munsinger | Mar. 16, 1942 |
| 2,279,443 | Chanosky | Apr. 14, 1942 |

FOREIGN PATENTS

| Number | Country | Date |
|---|---|---|
| 725,765 | France | Feb. 16, 1932 |
| 593,649 | Germany | Mar. 3, 1934 |